(12) United States Patent
Sukhman et al.

(10) Patent No.: US 11,198,193 B2
(45) Date of Patent: Dec. 14, 2021

(54) LASER PROCESSING SYSTEMS AND ASSOCIATED METHODS OF USE AND MANUFACTURE

(71) Applicant: Universal Laser Systems, Inc., Scottsdale, AZ (US)

(72) Inventors: Yefim P. Sukhman, Scottsdale, AZ (US); Mikhail E. Ryskin, Phoenix, AZ (US); Matt Ricketts, Scottsdale, AZ (US); David T. Richter, Scottsdale, AZ (US); Stefano J. Noto, Mesa, AZ (US); Lucas Gilbert, Scottsdale, AZ (US); Jonathan S. Marx, Scottsdale, AZ (US); Craig Beiferman, Scottsdale, AZ (US); Christian J. Risser, Scottsdale, AZ (US)

(73) Assignee: UNIVERSAL LASER SYSTEMS, INC., Scottsdale, AZ (US)

(*) Notice: Subject to any disclaimer, the term of this patent is extended or adjusted under 35 U.S.C. 154(b) by 257 days.

(21) Appl. No.: 16/277,885

(22) Filed: Feb. 15, 2019

(65) Prior Publication Data
US 2019/0255648 A1 Aug. 22, 2019

Related U.S. Application Data

(60) Provisional application No. 62/710,406, filed on Feb. 16, 2018.

(51) Int. Cl.
*B23K 26/06* (2014.01)
*B23K 26/0622* (2014.01)
(Continued)

(52) U.S. Cl.
CPC ............ *B23K 26/0626* (2013.01); *B22F 7/00* (2013.01); *B23K 26/0608* (2013.01);
(Continued)

(58) Field of Classification Search
CPC .... B23K 26/064; B23K 26/38; B23K 26/382; B23K 26/142; B23K 26/402;
(Continued)

(56) References Cited

U.S. PATENT DOCUMENTS 6,376,798 B1* 4/2002 Remue ................ B23K 26/046
219/121.67
6,961,361 B1* 11/2005 Tanaka ............... B23K 26/0604
372/101
(Continued)

FOREIGN PATENT DOCUMENTS

DE 10201200160 * 1/2012 ........... B23K 1/0056

OTHER PUBLICATIONS

Universal Laser Systems, User Guide, 2008, Universal Laser System Inc., pp. 106 and 180 (Year: 2008).*

*Primary Examiner* — Ibrahime A Abraham
*Assistant Examiner* — Simpson A Chen
(74) *Attorney, Agent, or Firm* — Perkins Coie LLP

(57) ABSTRACT

Systems and methods for laser processing systems and associated methods for using and manufacturing such systems are disclosed herein. In some embodiments, a laser processing system includes a controller, a laser source, a material support, and a beam delivery subsystem operably coupled to the controller. The beam delivery subsystem comprises an optical carriage assembly configured to receive and modify a laser beam from the laser source, and direct the laser beam toward a material to be processed carried by the material support. The optical carriage assembly is further configured to focus the laser beam within a material processing field to obtain an adjustable power density within a material processing plane and achieve an optimal selected condition for the material to be processed.

10 Claims, 10 Drawing Sheets

(51) Int. Cl.
    *B23K 26/08*         (2014.01)
    *B23K 26/067*      (2006.01)
    *B23K 26/073*      (2006.01)
    *B22F 7/00*         (2006.01)

(52) U.S. Cl.
    CPC ...... *B23K 26/0613* (2013.01); *B23K 26/0622* (2015.10); *B23K 26/0643* (2013.01); *B23K 26/0648* (2013.01); *B23K 26/0665* (2013.01); *B23K 26/0676* (2013.01); *B23K 26/073* (2013.01); *B23K 26/0869* (2013.01)

(58) Field of Classification Search
    CPC ........ B23K 26/082; G02B 7/04; G02B 7/023; G02B 7/026; G02B 7/14; G02B 7/027; G02B 7/02
    USPC .......... 359/813; 219/124.34, 121.78, 121.73, 219/121.74, 121.75
    See application file for complete search history.

(56) References Cited

U.S. PATENT DOCUMENTS

| | | | |
|---|---|---|---|
| 9,346,122 B1 * | 5/2016 | Sukhman | B23K 26/0617 |
| 2004/0040943 A1 * | 3/2004 | Lundberg | B44B 3/009 |
| | | | 219/121.68 |
| 2011/0075274 A1 * | 3/2011 | Spoerl | G02B 7/08 |
| | | | 359/814 |
| 2014/0014634 A1 * | 1/2014 | Liu | B23K 26/361 |
| | | | 219/121.68 |
| 2015/0217402 A1 * | 8/2015 | Hesse | B23K 26/064 |
| | | | 219/121.72 |

\* cited by examiner

LASER PROCESSING SYSTEMS AND ASSOCIATED METHODS OF USE AND MANUFACTURE

CROSS-REFERENCE TO RELATED APPLICATION(S)

This application claims the benefit of U.S. Provisional Patent Application No. 62/710,406, filed Feb. 16, 2018, which is incorporated herein by reference in its entirety.

TECHNICAL FIELD

The present disclosure is directed generally to laser processing systems and, more specifically, to laser processing systems that employ laser beams and associated methods of use and manufacture.

BACKGROUND

Laser processing systems are being adopted in manufacturing for material processing at an ever increasing rate. Laser processing offers many advantages over more conventional processing techniques. For example, laser processing is particularly suited for cutting shapes or profiles out of materials, marking or preparing materials by removing or modifying surface layers of materials, and welding or sintering materials, because it offers the advantage of providing non-contact, tool-less, and fixture-less methods of processing materials. In many cases, laser processing is replacing processes that require investments in tooling such as dies for die cutting, masks for silk screening, or templates and fixtures for hard tooling.

DETAILED DESCRIPTION

A. Overview

Figure 1:
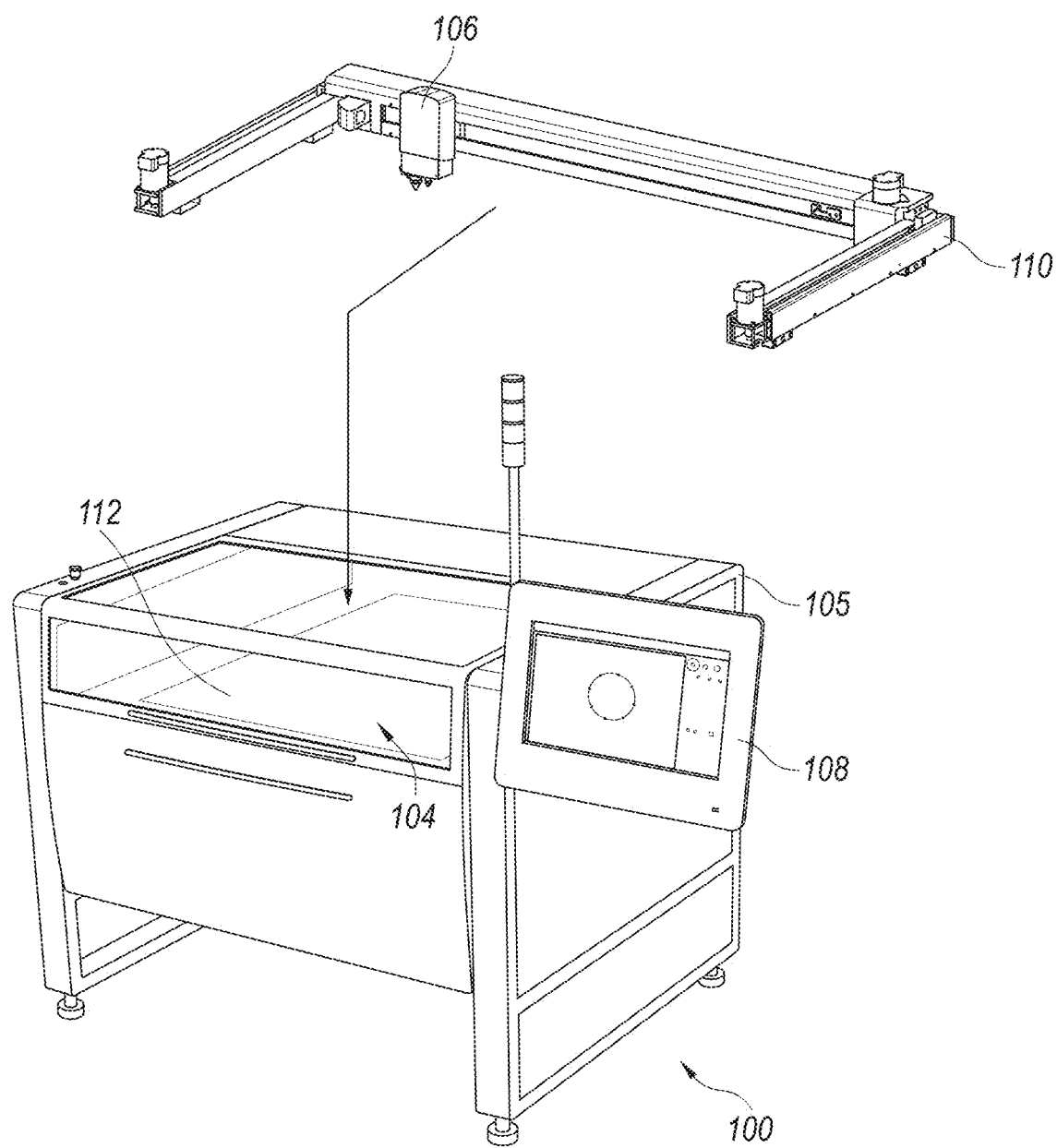
FIG. 1 is an illustration of a laser processing system configured in accordance with selected embodiments of the present technology.

The following disclosure describes various embodiments of laser processing systems and associated methods for using and manufacturing such systems. In some embodiments, a laser processing system includes a controller, a laser source, a material support, and a beam delivery subsystem operably coupled to the controller. The beam delivery subsystem comprises an optical carriage assembly configured to receive and modify a laser beam from the laser source, and direct the laser beam toward a material to be processed carried by the material support. The optical carriage assembly is further configured to focus the laser beam within a material processing field to obtain an adjustable power density within a material processing plane and achieve an optimal selected condition for the material to be processed.

In another embodiment of the present technology, a method for processing one or more materials or compositions of materials with a laser processing system comprises receiving a laser beam from a laser source and modifying the laser beam via a beam size modifier configured to provide discrete or infinitely variable expansion or contraction of the laser beam. The method further comprises directing the modified laser beam toward a material to be processed and focusing the modified laser beam within a material processing field. The laser beam comprises an adjustable power density selectively tailored, via the beam size modifier, for the material to be processed.

Certain details are set forth in the following description and in FIGS. 1-6D to provide a thorough understanding of various embodiments of the disclosure. Other details describing well-known structures and systems often associated with laser processing systems and methods for forming and using such systems, are not set forth in the following disclosure to avoid unnecessarily obscuring the description of the various embodiments of the disclosure.

Depending upon the context in which it is used, the term "optical element" can refer to any of a variety of structures that can direct, transmit, steer, shape, or otherwise modify or influence laser radiation. In general, the term "optical element" can refer to different structures that provide generally similar functions. In addition, optical elements can have any of a variety of shapes or configurations depending on cost, efficiency, or other parameters of an optical system. For example, in some embodiments a conventional spherical lens can be replaced with a Fresnel lens (or vice-versa). Further, unless clearly indicated by the context, the use of a specific term in the disclosure to describe an optical element (e.g., a lens, mirror, etc.) does not limit the optical element to that particular structure or device. The term "optics" as used herein can refer to a discrete arrangement of optical elements that can optionally include electrical components, mechanical components, or other suitable components.

Many of the details, dimensions, angles, or other portions shown in the Figures are merely illustrative of particular embodiments of the technology and may be schematically illustrated. As such, the schematic illustration of the features shown in the Figures is not intended to limit any structural features or configurations of the processing systems disclosed herein. Accordingly, other embodiments can have other details, dimensions, angles, or portions without departing from the spirit or scope of the present disclosure. In addition, further embodiments of the disclosure may be practiced without several of the details described below, while still other embodiments of the disclosure may be practiced with additional details or portions.

Laser processing systems configured in accordance with the present technology provide composite laser energy for processing one or more material or compositions of materials. A composite beam comprises component laser beams configured to provide the composite beam with beam characteristics suitable for processing the material(s). For example, the beam characteristics can be suited for processing compositions of materials that include mirrored acrylic, black Delrin, printed circuit boards, or other materials or compositions of materials. Conventional laser processing systems, by contrast, typically employ a single laser beam for material processing. The beam characteristics of the single laser can be ill suited or not ideal for processing a particular material. For example, a single laser may be effective for processing one material in a composition of materials, but damage other materials in the composition.

B. Embodiments of Laser Material Processing Systems and Associated Methods

FIG. 1, for example, is a partially exploded isometric view of a laser material processing system 100 ("processing system 100") configured to process materials and/or compositions in accordance with selected embodiments of the present technology. The processing system 100 includes a housing 102 with a laser material processing region or processing chamber 104. The processing chamber 104 contains a laser beam delivery subsystem 110 ("beam delivery subsystem") configured to deliver a laser beam from laser source 105 to material (not shown) to be laser processed within the processing chamber 104. The beam delivery subsystem 110 includes an optical carriage assembly 106 moveably coupled to guide member(s) and positioned over a surface of a work plane or material support 112. For purposes of illustration and clarity, the beam delivery subsystem 110 and optical carriage assembly 106 are shown in an exploded arrangement spaced apart from the housing 102 In operation, the carriage assembly 106 is movable along a first guide rail or guide member (extending along an X-axis) and a second guide rail/guide member and third guide rail/guide member (both extending along a Y-axis) along which the carriage assembly 106 may be positioned for processing. The X rail includes a motor, and the two Y rails each include a dedicated motor. The beam delivery subsystem 110 further includes linear encoders on both the X and Y rails. The synchronized X rail motor, dual Y rail motors, and linear encoders are expected to provide precision positioning of the optical carriage assembly 106 for increased accuracy and performance during laser processing. As explained in more detail with reference to FIGS. 2A-4B, the optical carriage assembly 106 is configured to guide a laser beam toward the surface of the work plane 112. The beam delivery subsystem 110 can be configured to weld or sinter materials, cut shapes or profiles out of materials, and mark or prepare materials by removing or modifying surface layers of materials.

The processing system 100 can further include a controller 108 operably coupled to the one or more motors for moving the optical carriage assembly 106 and/or one or more of the guide rails/guide members. In operation, the controller 108 can cause the beam delivery subsystem 110 to move the laser beam in X- and Y-axis directions to process materials placed on the work plane 112. The controller 108 can include, for example, a special purpose computer or data processor specifically programmed, configured, or constructed to perform computer-executable instructions. Furthermore, the controller 108 can refer to any device capable of communicating with a network or other electronics having a data processor and other components, e.g., network communication circuitry.

Figure 2A:
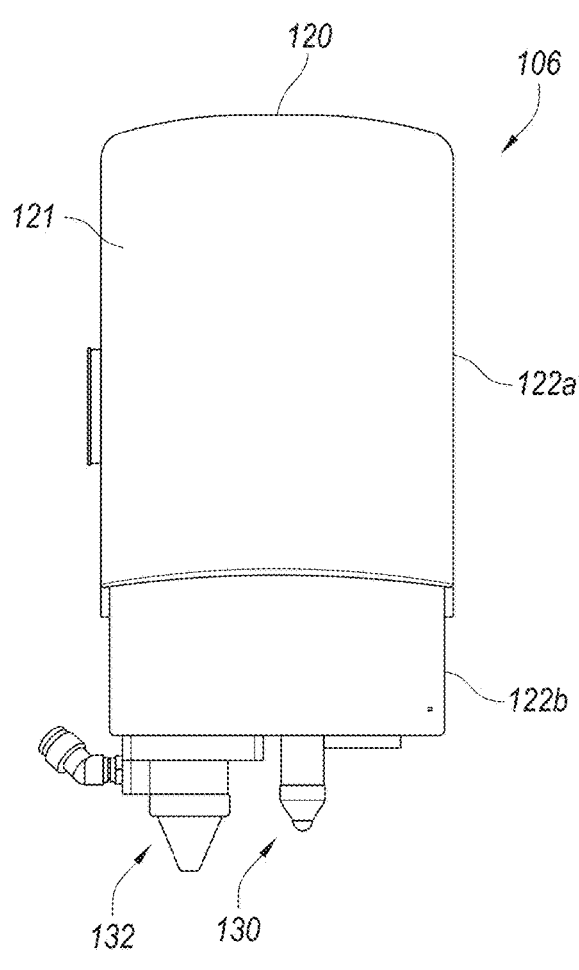
FIGS. 2A and 2B are illustrations of an optical carriage assembly configured in accordance with selected embodiments of the present technology.
Figure 2B:
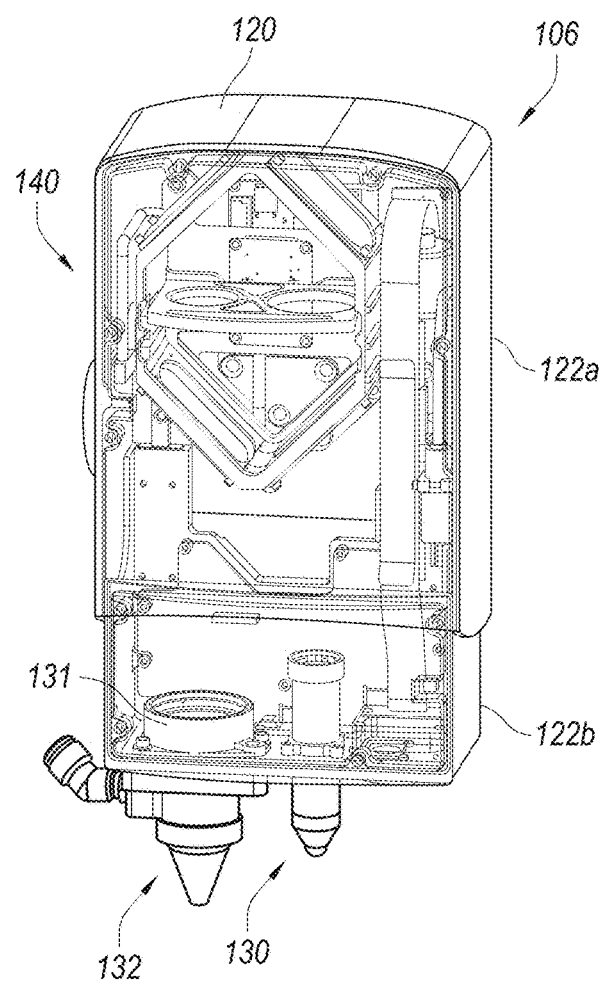

FIGS. 2A and 2B are isometric views of the optical carriage assembly 106 configured in accordance with selected embodiments of the present technology. Referring to FIGS. 2A and 2B together, the optical carriage assembly 106 includes a housing 120, a first section 122a, and a second section 122b attached to the first section 122a. The first section 122a and the second section 122b may both contain optical elements (e.g., reflective optics and/or refractive optics). As shown in FIG. 2A, a cover 121 may be attached to the housing 102 to seal and/or protect aspects of the carriage assembly 106 from the surrounding environment. In some embodiments, the second section 122b is moveable (e.g., in a direction perpendicular to the work plane 112 of FIG. 1) between a retracted position and an expanded position via one or more motors (not shown) controllable by the controller 108 (FIG. 1).

The optical carriage assembly 106 can further include an autofocus assembly 130, a final focus lens assembly 131 and a coaxial gas assist assembly 132. As shown in FIGS. 2A and 2B, the autofocus assembly 130 and the coaxial gas assist assembly 132 are positioned proximate one another and oriented in the same direction (i.e., toward a material to be processed). The coaxial gas assist assembly 132 can be configured to direct compressed gas coaxially with a laser beam focused by final focus lens assembly 131 toward the material to be processed by the optical carriage assembly 106. Referring to FIG. 2B (which illustrates the beam delivery subsystem 106 with the cover 121 (FIG. 2A) rendered transparent for purposes of illustration), the optical carriage assembly 106 can further include a optics assembly 140, which is described in more detail with reference to FIGS. 4A and 4B. Each of the autofocus assembly 130, coaxial gas assist assembly 132, final focus lens assembly 131 and/or optics assembly 140 can be operably coupled to the controller 108 (FIG. 1).

Figure 3B:
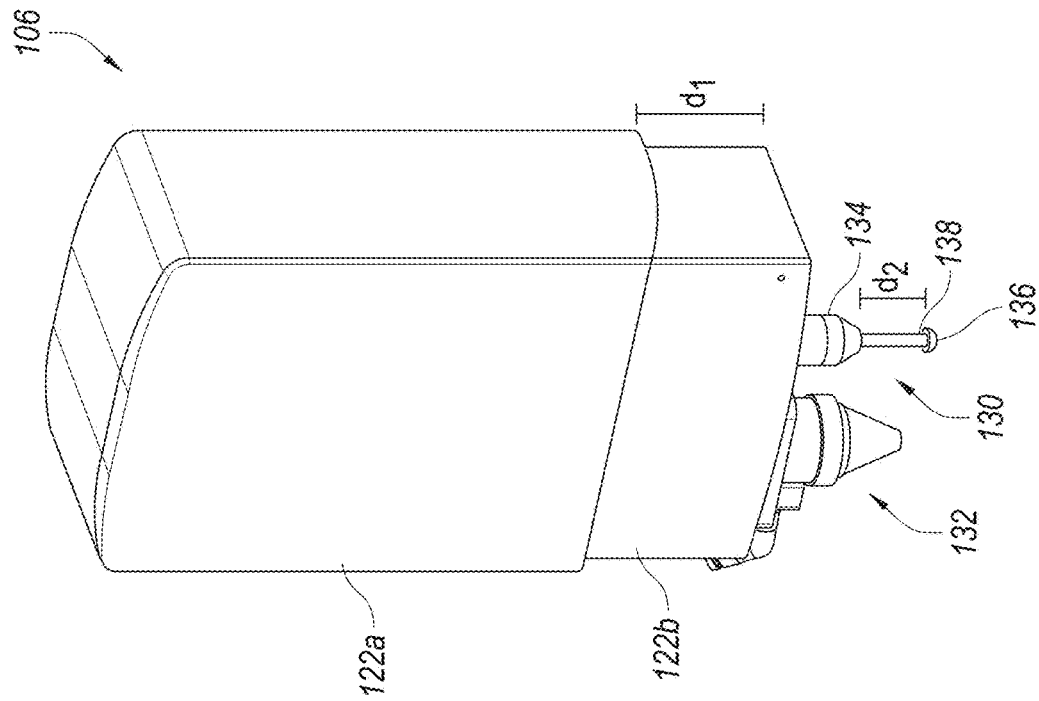
FIGS. 3A and 3B are illustrations of an optical carriage assembly having an autofocus assembly configured in accordance with selected embodiments of the present technology.
Figure 3A:
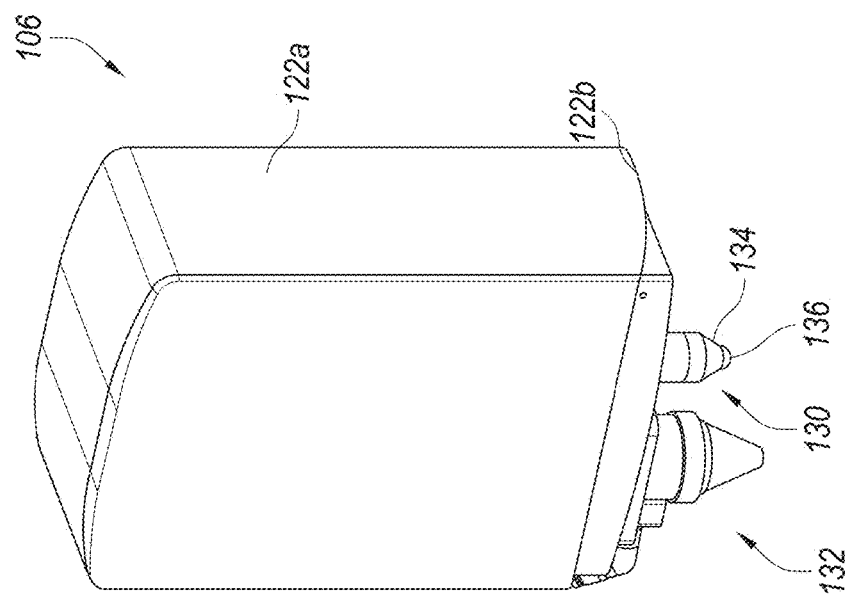

FIG. 3A is an illustration of the optical carriage assembly 106 with the autofocus assembly 130 in a first or retracted position, and FIG. 3B is an illustration of the optical carriage assembly 106 with the autofocus assembly 130 in a second or expanded (i.e., deployed) position. Referring to FIGS. 3A and 3B together, the autofocus assembly 130 in the illustrated embodiment includes a fixed portion 134, and a touch probe 136 attached to the fixed portion 134 via an extendable member 138 (FIG. 3B). The member 138 is extendable between the first or retracted position (as shown in FIG. 3A) and the second or expanded (i.e., deployed) position (as shown in FIG. 3B). In some embodiments, the member 138 may be movable (e.g., using a solenoid) away from the fixed portion 134 and toward the material to be processed (not shown). In other embodiments, other suitable techniques may be used to actuate the member 138.

In operation, the autofocus assembly 130 can be configured to automatically focus the laser of the optical carriage assembly 106 by causing the second section 122b of the optical carriage assembly 106 to move (e.g., from the retracted position to the expanded position) based on a distance determined by the autofocus assembly 130, or more specifically, by the expandable member 138. For example, in some embodiments, the extendable member 138 can be deployed in an extended position and moved toward the material such that the touch probe 136 senses a surface of the material to be processed. Signals from the touch probe 136 can then be communicated to the controller 108 (FIG. 1) and cause the second section 122b (and thus the final focus lens assembly 131) to be precisely adjusted toward or away from the material. The movement of the final focus lens assembly 131 can help achieve or maintain an optimal focus of the final focus lens assembly 131. In some embodiments, one or more distances measured by the autofocus assembly 130 can be correlated with an expandable position of the second section 122b. For example, as shown in FIG. 3B, a second distance ($d_2$) measured by the autofocus assembly 130 can correspond to an expandable position, as indicated by a first distance ($d_1$). In such embodiments, the optical carriage assembly 106 can maintain an optimal focus by only moving the carriage assembly (i.e., without moving the work plane 112 (FIG. 1) or the material), which can help produce more accurate cutting and better repeatability for the processing system 100 (FIG. 1).

In some embodiments, the autofocus assembly 130 may use other related methods or techniques to achieve similar functionality. For example, the autofocus assembly 130 may include a distance measurement device (e.g., a laser) to measure distance from a reference point of the autofocus assembly 130 to the material being processed. As previously described, the measured distance can be communicated to the controller 108 (FIG. 1) and be used to adjust the second section 122b of the optical carriage assembly 106 to one or more preselected vertical distances and maintain an optimal focus between the final focus lens assembly 131 and the material. In yet other embodiments, the autofocus assembly 130 may be omitted, and its features may be incorporated into the coaxial gas assist assembly 132.

Figure 4A:
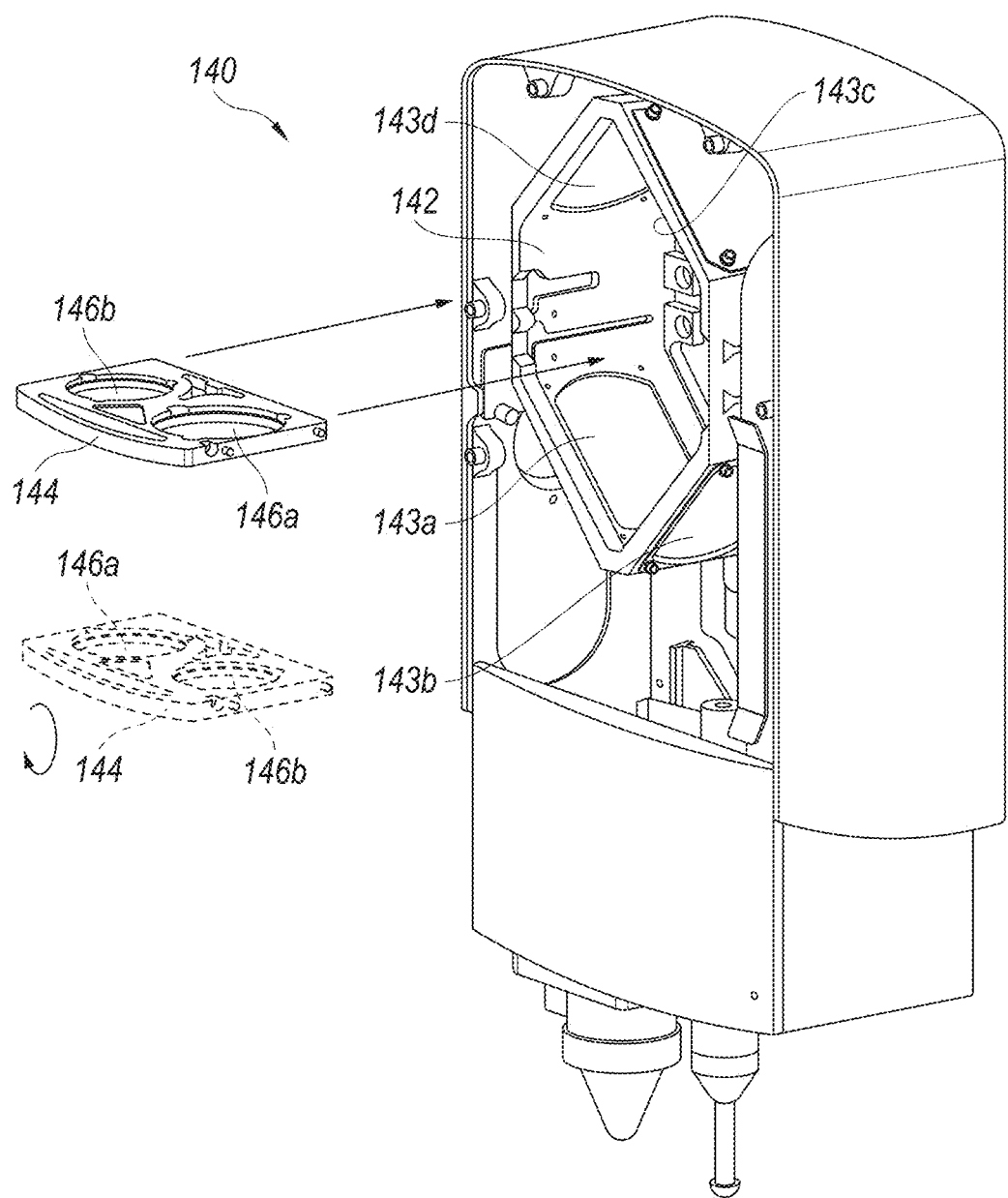
FIGS. 4A and 4B are illustrations of an optical carriage assembly having a laser beam conditioning optics unit configured in accordance with selected embodiments of the present technology.
Figure 4B:
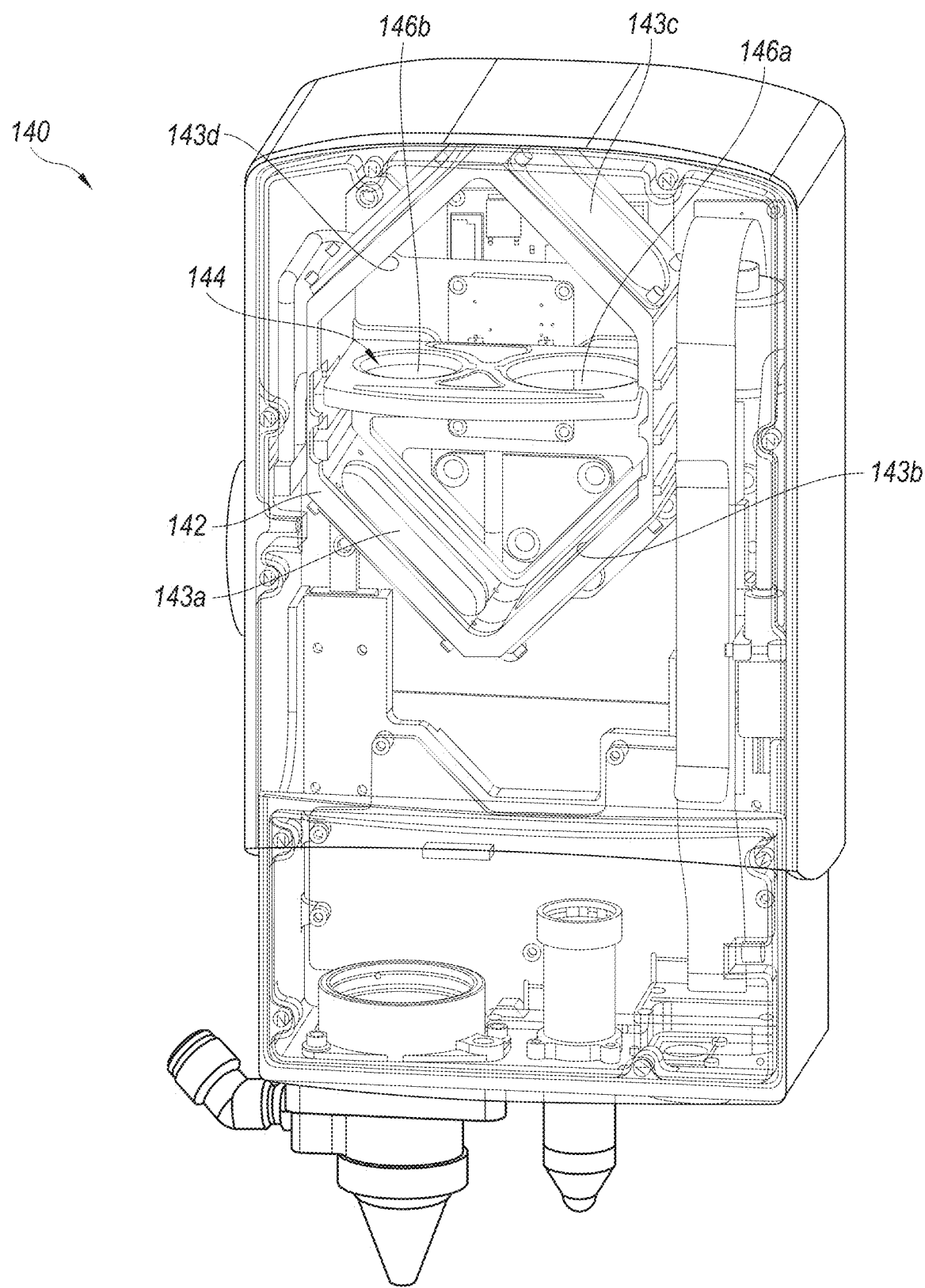

The autofocus functionality of the autofocus assembly 130 provides one aspect of the present technology that can be used to optimize current laser processing systems. In addition to or in lieu of the foregoing, the present technology may further optimize laser processing systems by controlling the wavelength, power density, delivered energy, and/or other parameters of the laser used to process materials. FIGS. 4A and 4B, for example, illustrate various details of the optics assembly 140 configured in accordance with selected embodiments of the present technology. In particular, FIG. 4A is a partially exploded isometric view with a portion of the optics assembly 140 removed for purposes of installation, and FIG. 4B is an isometric view of the fully assembled optics assembly 140. Referring to FIGS. 4A and 4B together, the optics assembly 140 includes a laser beam conditioning optics unit 142 ("conditioning unit 142") configured to affect (e.g., precondition, recompose, focus and/or modify) a laser beam via one or more optical elements 143 (four are shown as optical elements 143a, 143b, 143c, 143d). In operation, for example, the conditioning unit 142 is adapted to expand and/or contract the laser beam passing therethrough. Further details regarding operation of the conditioning unit 142 are described below with reference to FIGS. 5A and 5B. Additional aspects regarding the conditioning unit 142 and its operation are disclosed, for example, in U.S. Pat. No. 9,346,122, issued May 24, 2016, and entitled "MULTI-WAVELENGTH LASER PROCESSING SYSTEMS AND ASSOCIATED METHODS OF USE AND MANUFACTURE," which is incorporated by reference herein in its entirety.

The optics assembly 140 further comprises a power density optics unit 144 including a first optics portion 146a configured to hold a first lens, and a second optics portion 146b spaced laterally apart from the first optics portion 146a and configured to hold a second lens. As described in further detail below, the power density optics unit 144 is a laser beam size modifier configured to provide a discrete or infinitely variable expansion or contraction of the laser beam. The power density optics unit 144 is a modular, discrete component that can be removably installed with the conditioning unit 142 (as shown by the arrows) for operation. The first and second optics portions 146a and 146b can be generally similar or can vary from one another. For example, the first and second optics portions 146a and 146b can be sized to hold lenses of different diameters, thicknesses and/or orientations, or be configured to hold lenses made from different materials. Given these selectable differences, the first optics portion 146a can be configured to modify a parameter (e.g., size) of a laser beam, and the second optics portion 146b can be configured to further modify a parameter of the laser beam (e.g., size and/or a different parameter). Further, in some embodiments additional optics portions (e.g., third and fourth optics portions) and corresponding orientations (e.g., third and fourth orientations) may also be included to provide additional laser processing options for an operator.

The power density optics unit 144 may also be positioned in multiple orientations. For example, the power density optics unit 144 can be positioned in (a) a first orientation such that the first optics portion 146a is positioned on a right side of the illustrated conditioning unit 142, and the second optics portion 146b is positioned on a left side of the conditioning unit 142, or alternatively, as shown in broken lines in FIG. 4A for purposes of illustration, (b) a second orientation (e.g., rotated from the first orientation by 180 degrees about a central axis therethrough) such that the first optics portion 146a is positioned on the left side of the conditioning unit 142 and the second optics portion 146b is positioned on the right side of the conditioning unit 142. Reversing the power density optics unit 144 within the optics assembly 140 reverses its effects (expansion/contraction of the laser beam). In one particular embodiment, the first and second optics portions 146a and 146b may comprise, for example, a 1×/13× power density module configured to expand/contract the laser beam passing therethrough. In another particular embodiment, the first and second optics portions 146a and 146b may comprise, for example, a 3×/5× power density module configured to expand/contract the laser beam passing therethrough. In still other embodiments, the first and second optics portions 146a and 146b may have other expansion/contraction ratios and/or other characteristics. Furthermore, in some embodiments, the particular orientation of the power density optics unit 144 may be detected (e.g., by a sensor), and communicated to the controller 108 (FIG. 1). In such an embodiment, the controller 108 (FIG. 1) may then further optimize one or more of the parameters by adjusting other aspects (e.g., one or more of the laser sources) of the processing system 100 (FIG. 1).

Figure 5A:
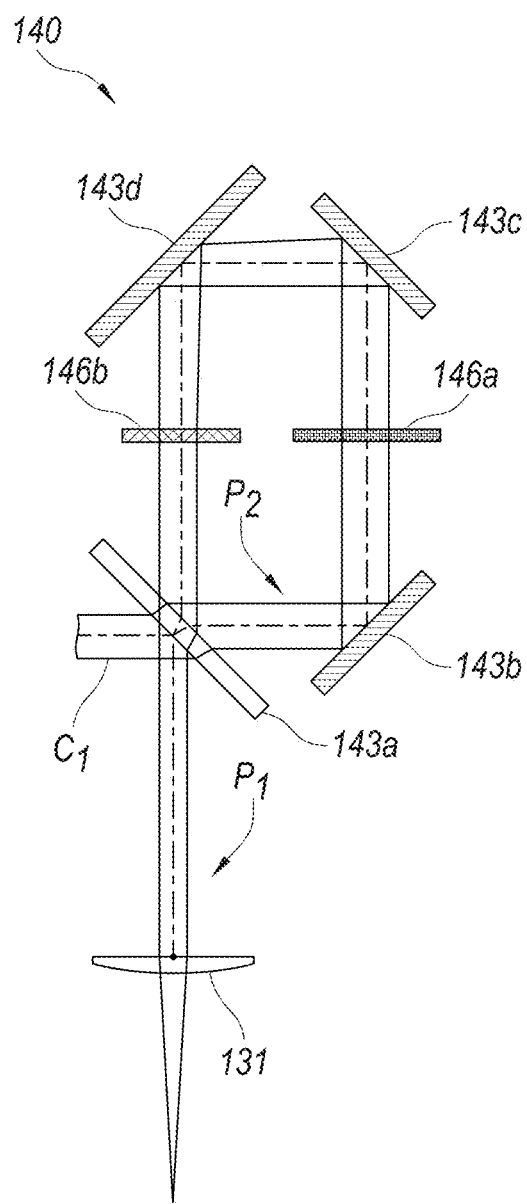
FIGS. 5A and 5B are schematic views of the conditioning unit of FIGS. 4A and 4B employing optical elements for expanding/contracting beams and selectively adjusting the power density profile of such beams in accordance with embodiments of the present technology.
Figure 5B:
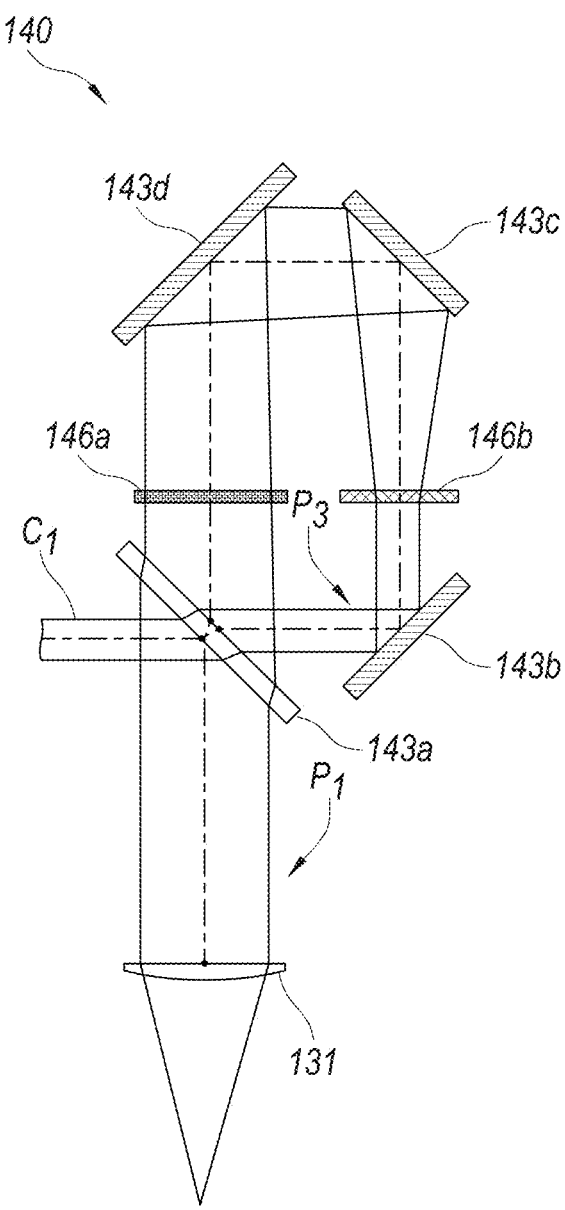

FIGS. 5A and 5B, for example, are schematic views of the conditioning unit 142 of the optics assembly 140 employing optical elements for expanding/contracting beams and selectively adjusting the power density profile of such beams in accordance with embodiments of the present technology. In these particular examples, a composite laser beam $C_1$ generated from a laser source (not shown) is transmitted toward a first optical element 143a (e.g., a reflector/splitter) configured to separate the composite beam $C_1$ and modify individual laser beams via selective transmission and selective reflection. In such an embodiment, the composite beam $C_1$ can include, for example, two individual laser beams-one laser beam $P_1$ is reflected toward the final focus lens assembly 131 to process material thereunder at focal plane $F_1$, and the other laser beam $P_2$ is further modified by features of the conditioning unit 142. In particular, referring first to FIG. 5A, laser beam $P_2$ is reflected by optical element 143b, passes through first optics portion 146a of power density optics unit 144 (FIG. 4A) for modification (e.g., contraction), and is then reflected by optical elements 143c and 143d before passing through the second optics portion 146b of power density optics unit 144 for further modification (e.g., collimation). The modified laser beam $P_2$ is then passed again through the first optical element 143a toward the final focus lens 131 and is focused to focal plane $F_1$.

Referring next to FIG. 5B, the orientation of the power density optics unit 144 (FIG. 4A) is reversed from that shown in FIG. 5A. In this arrangement, laser beam $P_3$ is reflected by optical element 143b, passes through the second optics portion 146b of power density optics unit 144 for modification (e.g., expansion), and is then reflected by optical elements 143c and 143d before passing through the first optics portion 146a of power density optics unit 144 for further modification (e.g., collimation). The modified laser beam $P_3$ is then passed again through the first optical element 143a toward the final focus lens 131 and is focused to focal plane $F_1$.

As described above, in practice a laser beam generated from a laser source (not shown) is directed through the first optics portion 146a, the second optics portion 146b, and toward the final focus lens assembly 131 to process material thereunder. Depending on the orientation of the power density optics unit 144, the laser beam can pass through the first optics portion 146a and then the second optics portion 146b or, alternatively, the laser beam can pass through the second optics portion 146a and then the first optics portion 146b. As noted above, the power density optics unit 144 is a beam size modifier configured to provide discrete or infinitely variable expansion or contraction of the laser beam. An advantage of the above-described features of the power density optics unit 144 is the ability for an operator to precisely control power density of the laser processing system 100 without adjusting a final focus lens (e.g., the final focus lens assembly 131) or the working distance between the final focus lens and the material to be processed.

Control of laser power density is important when optimizing/customizing laser processing parameters for a wide variety of material to be processed. For example, depending on the particular needs of an operator, the power density optics unit 144 can be positioned to optimize power density of the laser beam, which is expected to result in greater cutting accuracy and/or repeatability of the laser processing system 100. The modular nature of the power density optics unit 144 further allows an operator to precisely control power density (along with other laser processing parameters) via the optics assembly 140 without the need to change/update the other optical elements within the optics assembly 140, a final focus lens (e.g., the final focus lens assembly 131) or the working distance between the final focus lens and the material to be processed. Yet another advantage of the present technology is that the optics assembly 140 is more compact than many conventional optical systems having a larger number of optical elements for providing the same optical functions.

FIGS. 6A-6D are display diagrams illustrating various example configurations for the power density optics unit 144 and the resulting focal range (the distance from the focal plane at which the power density and focal spot diameter remain substantially unchanged) and focal spot laser power distribution profiles associated with such configurations. The following examples are based on the arrangement of the power density optics unit 144 described above with reference to FIGS. 4A-5B. It will be appreciated, however, that the examples described herein are merely specific examples of particular configurations for the power density optics unit 144, and in other embodiments the power density optics unit 144 may have different configurations and/or features.

Figure 6A:
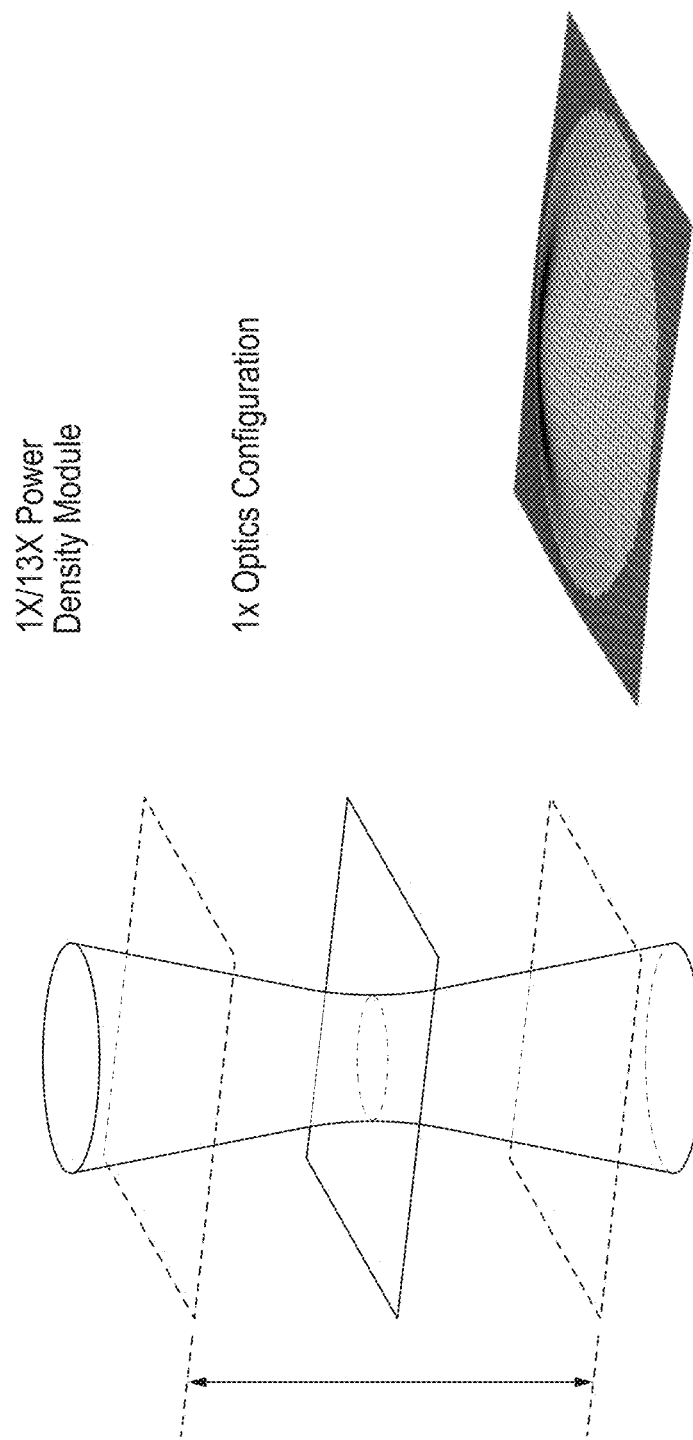
FIGS. 6A-6D are display diagrams illustrating various example configurations for power density optics units configured in accordance with embodiments of the present technology and the resulting focal range and beam profiles.
Figure 6B:
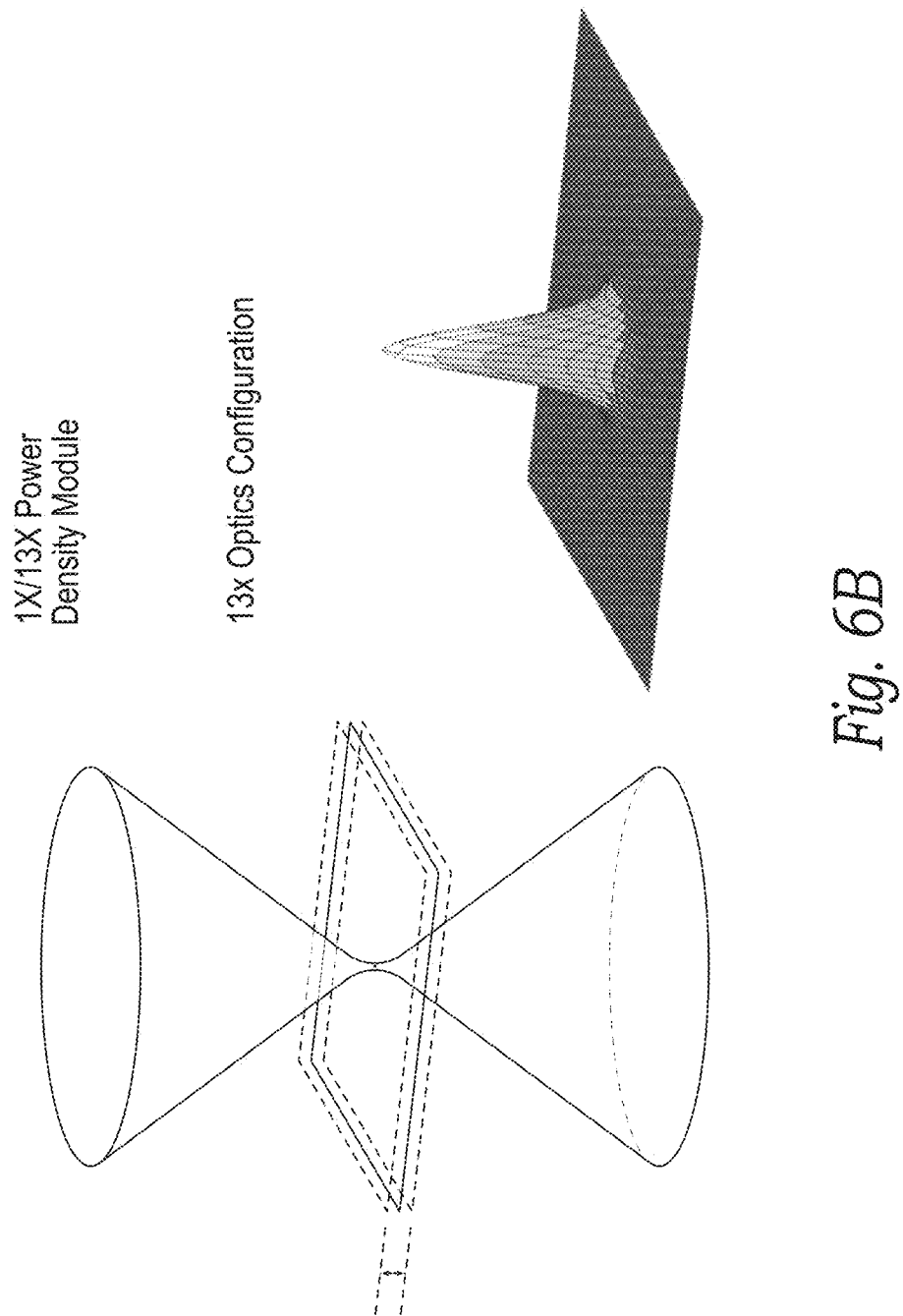

FIGS. 6A and 6B, for example, illustrate the optics configurations and resulting beam profiles when the power density optics unit 144 comprises a 1×/13× module with a high expansion/contraction ratio. In the 1× configuration (as shown in FIG. 6A), the resulting beam has a long focal range and minimal/low power density (as shown by the 3D beam profile diagram). In the 13× configuration (FIG. 6B), the resulting beam has a short focal range and maximum power density.

Figure 6C:
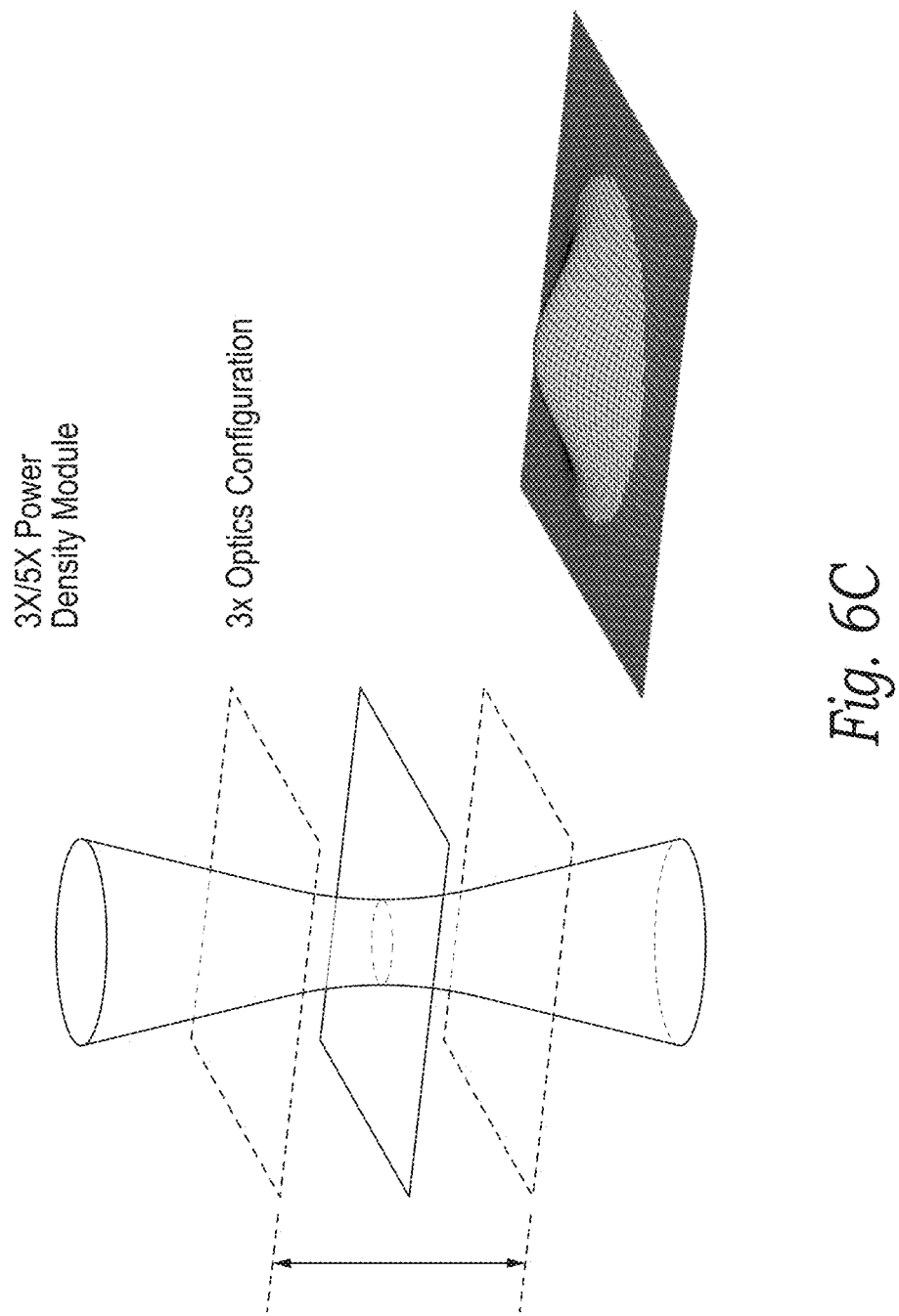
Figure 6D:
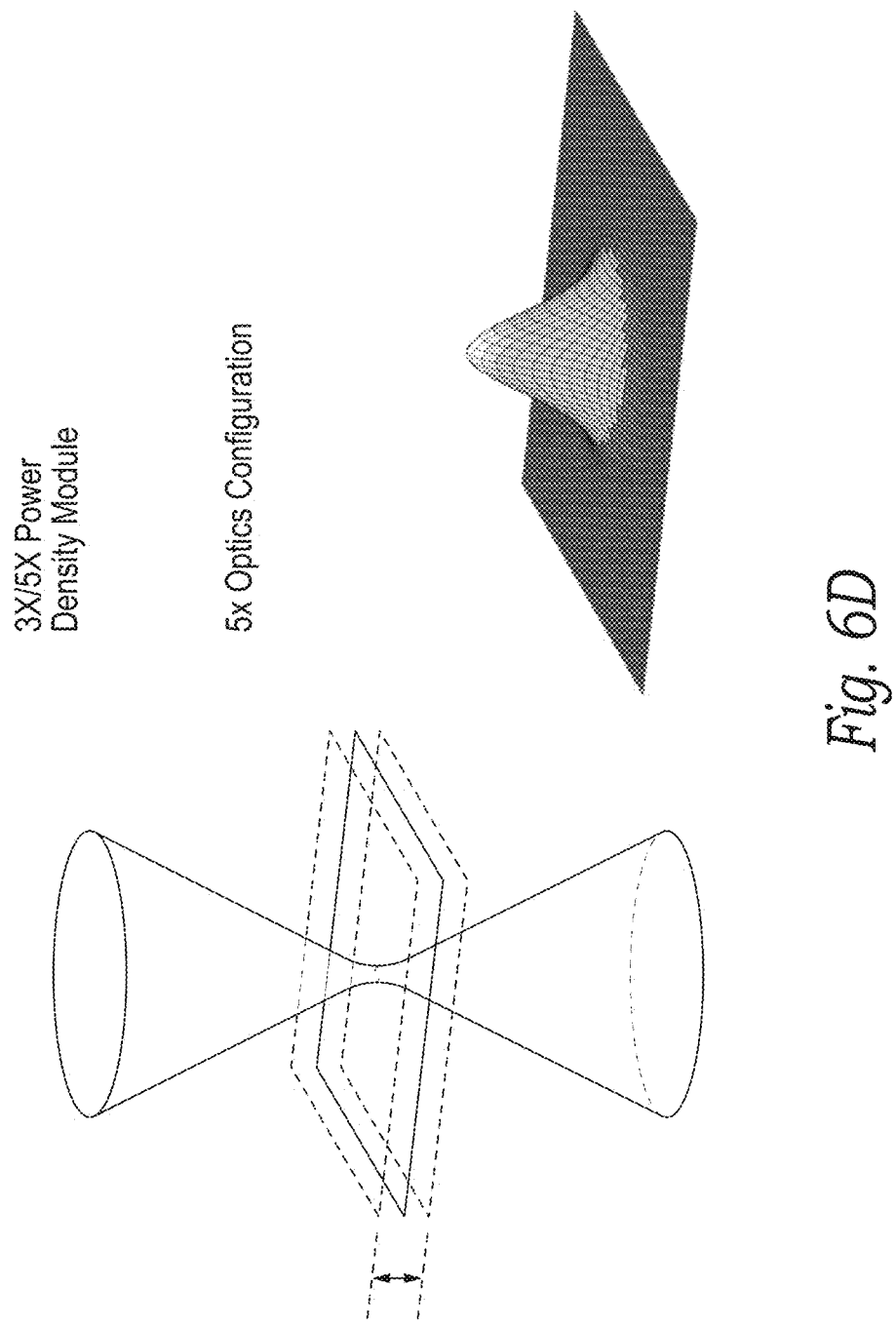

FIGS. 6C and 6D illustrate the optics configurations and resulting beam profiles when the power density optics unit 144 comprises a 3×/5× module with lower expansion/contraction ratios than that described above. For example, in the 3× configuration (as shown in FIG. 6C), the resulting beam has a medium-long focal range and an increased power density (relative to the minimum power density illustrated in FIG. 6A). Referring next to FIG. 6D, in the 5× configuration, the resulting beam has a medium-short focal range and a further increased power density.

As discussed above, various aspects and implementations of the technology as described herein can be provided automatically or semi-automatically. Although this has been described in the general context of computer-executable instructions, such as routines executed by a general-purpose computer, e.g., a server or personal computer. Those of ordinary skill in the art will appreciate that aspects of the technology can be practiced with other computer system configurations, including Internet appliances, set-top boxes, hand-held devices, wearable computers, mobile phones, multiprocessor systems, microprocessor-based systems, minicomputers, mainframe computers, programmable logic controllers, or the like. Aspects of the technology can be embodied in a special purpose computer or data processor that is specifically programmed, configured, or constructed to perform one or more of the computer-executable instructions explained in detail below. Indeed, the terms "computer" or "controller" as used generally herein, refers to any of the above devices as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

Aspects of the technology can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips).

Alternatively, aspects of the invention may be distributed electronically over the Internet or over other networks (including wireless networks). Those of ordinary skill in the art will recognize that portions of the technology may reside on a server computer, while corresponding portions reside on a client computer. Data structures and transmission of data particular to aspects of the invention are also encompassed within the scope of the technology.

C. Conclusion

From the foregoing, it will be appreciated that specific embodiments of the disclosure have been described herein for purposes of illustration, but that various modifications may be made without deviating from the spirit and scope of the various embodiments of the disclosure. For example, although many of features of the system are described above with reference to singular components that are illustrated schematically in the Figures, in other embodiments the system can include multiple components. Similarly, while certain features are shown have multiple components, in other embodiments, the system can include more or fewer components than are illustrated. Moreover, because many of the basic structures and functions of laser processing systems are known, they have not been shown or described in further detail to avoid unnecessarily obscuring the described embodiments.

As used herein, the word "or," unless expressly stated to the contrary, means any single item in a list of items, all of the items in the list, or any combination of the items in the list. The expression "an embodiment," or similar formulations thereof, means that a particular feature or aspect described in connection with the embodiment can be included in at least one embodiment of the present technology. For ease of reference, identical reference numbers are used herein to identify similar or analogous components or features; however, the use of the same reference number does not imply that the parts should be construed to be identical. Indeed, in many examples described herein, identically-numbered parts are distinct in structure or function.

Many of the details, dimensions, angles, or other portions shown in the Figures are merely illustrative of particular embodiments of the technology and may be schematically illustrated. As such, the schematic illustration of the features shown in the Figures is not intended to limit any structural features or configurations of the processing systems disclosed herein. Accordingly, other embodiments can have other details, dimensions, angles, or portions without departing from the spirit or scope of the present disclosure. In addition, further embodiments of the disclosure may be practiced without several of the details described below, while still other embodiments of the disclosure may be practiced with additional details or portions. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A laser material processing system, comprising:
a controller;
a laser source;
a material support; and
a beam delivery subsystem operably coupled to the controller, wherein the beam delivery subsystem comprises an optical carriage assembly configured to—
receive and modify a laser beam from the laser source,
direct the laser beam toward a material to be processed carried by the material support,
focus the laser beam within a material processing field to obtain an adjustable power density within a processing plane of the material and achieve an optimal selected condition for the material to be processed,
wherein the optical carriage assembly further comprises a beam size modifier configured to provide a discrete or infinitely variable expansion or contraction of the laser beam, and wherein the beam size modifier includes a first optics portion and a second optics portion different than the first optics portion, and further wherein the first optics portion of the beam size modifier is spaced apart from the second optics portion,
wherein the beam size modifier is a modular component configured to be removably installed, without the use of hand tools, into the beam delivery subsystem (a) in a first orientation such that the laser beam received from the laser source is expanded before being focused within the material processing field or (b) a second orientation such that the laser beam received from the laser source is contracted before being focused with the material processing field.

2. The laser material processing system of claim 1 wherein the optical carriage assembly of the beam delivery subsystem is adapted to be selectively positioned in an X- and Y-direction within the material processing field.

3. The laser material processing system of claim 1 wherein the beam size modifier is a first beam size modifier, and wherein the first beam size modifier is replaceable with one or more second beam size modifiers different than the first beam size modifier, and further wherein each second beam size modifier is configured to provide a selected power density for the laser beam within the material processing plane.

4. The laser material processing system of claim 1 wherein the optical carriage assembly comprises a first section and a second section attached to the first section, and wherein the second section is movable in direction perpendicular to the material processing plane between a retracted position and an expanded position.

5. The laser material processing system of claim 4 wherein the first section contains reflective optics and the second section contains refractive optics, and wherein the second section is automatically movable via one or more motors.

6. The laser material processing system of claim 5 wherein the optical carriage assembly is configured to maintain a fixed focal distance between a portion of the second section of the beam delivery subsystem and the material processing field during expansion and/or contraction of the laser beam via the beam size modifier.

7. The laser material processing system of claim 6, further comprising an autofocus assembly having a fixed portion, an extendable member attached to the fixed portion, and a touch probe attached to the extendable member.

8. The laser material processing system of claim 7 wherein the autofocus assembly is configured to (a) detect a surface of the material to be processed, and (b) cause a movable part of the beam delivery subsystem to move perpendicular to the surface of the material and maintain the preselected vertical distance.

9. A laser processing system, comprising:
a controller, and
an optical carriage assembly operably coupled to the controller; and a power density optics unit comprising a first optics portion and a second optics portion spaced apart from the first optics portion, and wherein the first optics portion is different than the second optics portion, wherein the power density optics unit is a discrete modular component configured to be removably installed, without the use of hand tools, with the optical carriage assembly in—

(a) a first orientation such that the laser beam received from the laser source has a first power density at the material processing field, or (b) a second, different orientation such that the laser beam received from the laser source has a second power density at the material processing field, wherein the second power density is different than the first power density, and wherein the first orientation of the power density optics unit is 180 degrees different than the second orientation, and wherein the optical carriage assembly is configured to—receive a laser beam from a laser source, expand and/or contract the laser beam via the power density optics unit such that the laser beam has a selected power density, and direct the laser beam toward a material to be processed, wherein the laser beam is focused within a processing field of the material at the selected power density for the material to be processed.

10. The laser processing system of claim 9 wherein the first optics portion is spaced laterally apart from the second optics portion within the power density optics unit.

* * * * *

UNITED STATES PATENT AND TRADEMARK OFFICE
CERTIFICATE OF CORRECTION

PATENT NO. : 11,198,193 B2
APPLICATION NO. : 16/277885
DATED : December 14, 2021
INVENTOR(S) : Sukhman et al.

It is certified that error appears in the above-identified patent and that said Letters Patent is hereby corrected as shown below:

In the Specification

In Column 6, Line 30, delete "1×/13×" and insert -- 1X/13X --.

In Column 6, Line 33, delete "3×/5×" and insert -- 3X/5X --.

In Column 8, Line 1, delete "1×/13×" and insert -- 1X/13X --.

In Column 8, Line 2, delete "1×" and insert -- 1X --.

In Column 8, Line 5, delete "13×" and insert -- 13X --.

In Column 8, Line 10, delete "3×/5×" and insert -- 3X/5X --.

In Column 8, Line 12, delete "3×" and insert -- 3X --.

In Column 8, Line 15, delete "5×" and insert -- 5X --.

Signed and Sealed this
Twenty-sixth Day of April, 2022

Katherine Kelly Vidal
*Director of the United States Patent and Trademark Office*